United States Patent [19]

Chai

[11] 4,405,917

[45] Sep. 20, 1983

[54] MATRIX SCREENING AND GROUNDING ARRANGEMENT AND METHOD

[75] Inventor: Thomas Y. Chai, Freeport, Ill.

[73] Assignee: Honeywell Inc., Minneapolis, Minn.

[21] Appl. No.: 258,248

[22] Filed: Apr. 28, 1981

[51] Int. Cl.³ .............................................. G06F 3/02
[52] U.S. Cl. ............................ 340/365 C; 340/365 S
[58] Field of Search ............ 340/365 R, 365 S, 365 E, 340/365 C; 178/17 C, 17 A

[56] References Cited

U.S. PATENT DOCUMENTS

| | | | |
|---|---|---|---|
| 3,750,113 | 7/1973 | Cencel | 340/365 C |
| 3,949,365 | 4/1976 | Kashio | 340/365 S |
| 4,037,225 | 7/1977 | Duvall | 340/365 E |
| 4,211,915 | 7/1980 | Miller et al. | 340/365 E |
| 4,274,752 | 6/1981 | Huber et al. | 340/365 C |

OTHER PUBLICATIONS

*IBM Technical Disclosure*, Bufford, vol. 21, No. 11, Apr. 1979, pp. 4548–4549.
*IBM Technical Disclosure*, Hoffman, vol. 22, No. 4, Sep. 1979, pp. 1536–1537.
1978 *IEEE International Solid-State Circuits Conference*, Katz, Feb. 1978, pp. 202–203.
*IEEE Journal of Solid-State Circuits*, Katz et al., vol. SC-13, No. 5, Oct. 1978, pp. 561–565.
*Patent Abstracts of Japan*, vol. 2, No. 156, p. 10106E 78, Dec. 26, 1978.

Primary Examiner—James J. Groody
Attorney, Agent, or Firm—Charles L. Rubow

[57] ABSTRACT

A capacitance keyboard matrix screening and grounding arrangement and method are disclosed in which scanning drive means and scanning sense means sequentially address drive and sense conductors in drive and sense conductor arrays respectively and maintain a reference potential on all conductors except for individual conductors while they are being addressed. The scanning drive and sense means are implemented with demultiplexers whose output terminals are each connected to a drive or sense conductor through an inverter.

9 Claims, 1 Drawing Figure

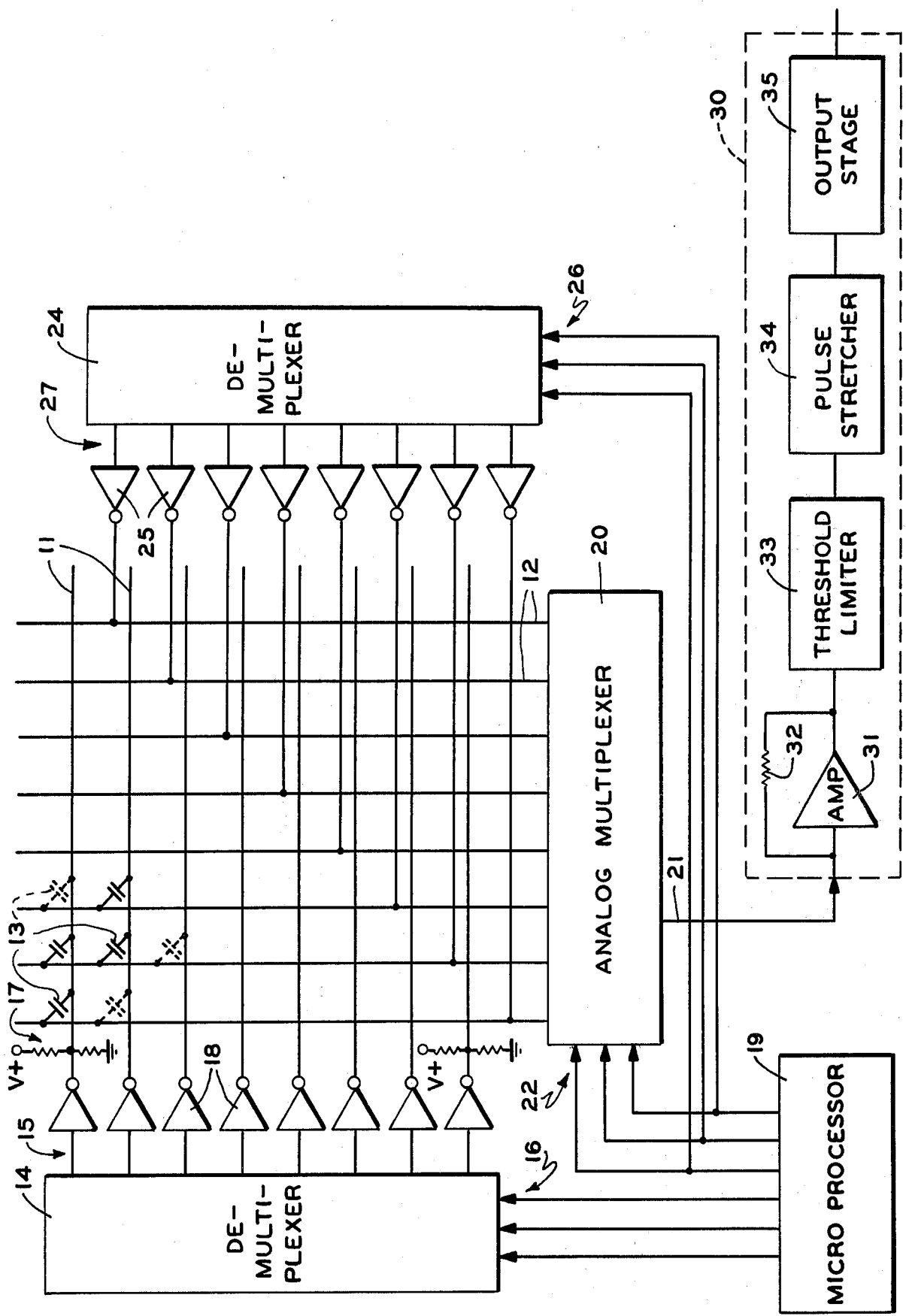

MATRIX SCREENING AND GROUNDING ARRANGEMENT AND METHOD

BACKGROUND OF THE INVENTION

The invention disclosed herein relates generally to a technique and implementation for preventing undesired interconductor coupling and spurious signals in a switching matrix, and more particularly to apparatus and a technique for eliminating cross talk, electrical interference and sensing ambiguities in a capacitive keyboard.

Electronic keyboards have long comprised a primary form of input device for information handling and data processing systems. With the proliferation of and technological advances in such systems has come increased demands on the performance and durability of keyboard input devices. Further, the rapid recent proliferation of smaller and less expensive systems requiring keyboard input devices has increased the demand for less expensive keyboards.

Capacitive keyboards are well known in the field of data input devices. They provide certain inherent advantages over electrical contact keyboards. These advantages particularly include mechanical simplicity, long life and absence of electrical signal problems caused by contact bounce and corrosion.

However, as set forth in numerous publications, including U.S. Pat. No. 3,750,113 issued to J. Cencel on July 31, 1973, and U.S. Pat. No. 3,921,166 issued to J. Volpe on Nov. 18, 1975, capacitive keyboards have suffered from another problem which is particularly significant in capacitively coupled systems. This problem stems from the fact that there is inherent capacitive coupling between every pair of elements in a keyboard. Thus, in a typical capacitive keyboard having a matrix of conductors including drive signal and sense signal conductors, a signal on any conductor will normally appear to some extent on every other conductor. Obviously, this phenomenon complicates the task of detecting which of an array of variable capacitors between pairs of conductors in the matrix is actuated, thus varying the capacitive coupling it provides.

As noted in the above-identified patents, a variety of techniques have been employed in an attempt to minimize problems caused by stray capacitive coupling. These techniques include the use of ground lines interleaved between the drive and/or sense conductors, ground planes and various forms of shielding. In addition, various electronic signal detection, verification and processing techniques have been employed to improve the reliability of detecting and distinguishing valid key actuation signals from signals caused by stray coupling. Some techniques representative of this approach are disclosed in U.S. Pat. No. 3,931,610 issued to R. Marin, et al on Jan. 6, 1976, U.S. Pat. No. 4,163,222 issued to D. Gove on July 31, 1979 and U.S. Pat. No. 4,211,915 issued to D. Miller, et al on July 8, 1980, as well as previously identified U.S. Pat. No. 3,921,166.

All of the foregoing techniques involve the addition of elements to either the basic keyboard matrix or the signal detection, verification and processing circuitry. Accordingly, these techniques are undesirable to the extent that they contribute to the complexity, size, cost and potential unreliability of the keyboard systems.

In addition, all of these techniques suffer to some extent from an inability to effectively eliminate the basic problem of stray coupling and/or its effects on signal detection. Specifically, although screening lines, ground planes and shielding do provide a degree of isolation of individual conductors in the keyboard matrix, such isolation is not complete and stray coupling is not totally eliminated. With or without the use of conventional screening and shielding, electronic signal detection and verification is only effective to the extent that signals due to stray coupling and other electrical interference differ from valid signals and to the extent that such differences can be feasibly detected.

The present invention avoids many of the principal disadvantages of the above-described techniques through the use of electronic grounding of inactive conductors in the basic keyboard matrix. Electronic grounding is simply accomplished with a minimal addition of common electronic components. No elements are required to be added to the basic keyboard matrix. Stray coupling is effectively totally eliminated. Finally, the present invention inherently provides N-key rollover operation.

SUMMARY OF THE INVENTION

The present invention comprises apparatus and a method for effectively eliminating cross talk and interference in a capacitive keyboard of the type in which first and second sets of conductors are coupled by an array of key actuated variable capacitors such that each capacitor couples a distinct pair of conductors comprising one conductor from each set, and in which the sets of conductors are scanned to detect actuated capacitors. In its most basic form, apparatus according to the invention comprises means for normally maintaining the conductors in at least the first set of conductors at a reference potential and sequentially permitting individual conductors in the set to assume a potential different from the reference potential. The apparatus also includes a scanning detector for sequentially sensing the potentials on individual conductors and means for coordinating operation so that the signal on each conductor is sensed only during the time interval in which the conductor is permitted to assume a potential different from the reference potential. Preferably both sets of conductors are normally maintained at the reference potential, and conductors in the second set are sequentially impressed with a potential different from the reference potential.

The method of the present invention basically comprises sequentially addressing individual conductors in the first and second sets of conductors by selectively supplying a drive signal to individual conductors in one set and selectively receiving a signal from individual conductors in the other set, while maintaining a reference potential on all conductors except for individual conductors while they are being addressed.

DESCRIPTION OF THE DRAWING

The single FIGURE of the drawing is a general schematic block diagram of capacitive keyboard apparatus in accordance with the present invention.

DESCRIPTION OF THE PREFERRED EMBODIMENT

Schematically illustrated in the FIGURE is an 8 by 8 matrix of capacitive keyboard conductors. Although an 8 by 8 matrix is shown, the apparatus and method of the present invention may be easily applied to a matrix of any size. The matrix includes a first set or plurality of conductors 11 to which drive signals are supplied and a second set or plurality of conductors 12 on which signals are sensed. Although the conductors are represented by sets of parallel horizontal and vertical lines for illustrative purposes, it is pointed out that conductors in an actual keyboard matrix may follow a considerably more complex and irregular pattern.

As illustrated in the FIGURE, a capacitor is located at each crossing of conductors in the first and second sets. Accordingly, the capacitors are shown and may be described as an array of capacitors comprising a plurality of rows and a plurality of columns of capacitors. For purposes of the following description, the terms "rows" and "columns" refer to an idealized electrical layout of a keyboard. The terms are intended to cover a range of physical configurations regardless of whether or not the capacitors are physically arranged in regular columns and rows. Although only a few capacitors are illustrated, it should be understood that, in fact, there is such a capacitor at each crossing of a conductor in one set with a conductor in the other set of conductors.

Capacitors 13 are key actuated variable capacitors each having a fixed plate and a movable plate, and may be referred to as capacitive key switches. One of the plates of each of the capacitors is connected to one of conductors 11. The other plate of each capacitor is connected to one of conductors 12. Accordingly, each capacitor provides variable capacitive coupling between a unique pair of conductors comprising one conductor from each set of conductors. It may also be observed that unless suitable provisions are made, there will be stray capacitive coupling to some degree between each conductor and every other conductor in the first and sets of conductors.

Conductors 11 are sequentially supplied with a drive signal by scanning drive means including a first decoder or demultiplexer 14 having a plurality of output terminals 15 and address terminal means 16. Demultiplexer 14 may be one of various suitable commercially available demultiplexers, such as a 74154 4-line to 16-line decoder/demultiplexer manufactured by Texas Instruments Inc. The output terminals of such a demultiplexer are normally at a logical high state, and may be selectively caused to go to a logical low state in response to a suitable address supplied to address terminal means 16.

A bias means or network identified by reference numeral 17 is connected to each of conductors 11, and tends to maintain the conductors at a potential higher than electrical ground. Only two of the conductors are shown with the bias means for illustrative purposes. However, it should be understood that each of conductors 11 is biased to a potential different from ground.

Each of the output terminals 15 of demultiplexer 14 is connected to a separate one of conductors 11 through a separate one of a plurality of inverters 18. Each of inverters 18 operates such that when supplied with a logical high input signal, its output is at a reference potential, which is typically electrical ground. The combination of the demultiplexer and inverters may be considered as grounding means. When an inverter 18 is supplied with a logical low input signal, the potential on its output terminal and the conductor connected thereto is determined by the associated bias network. Accordingly the conductor assumes a supply potential different from the reference potential.

The address signals for demultiplexer 14 are generated by a microprocessor or other address generator 19. Microprocessor 19 is typically programmed to generate a sequence of addresses such that individual output terminals of demultiplexer 14, and hence individual conductors 11 are selectively addressed in sequence. Accordingly, individual conductors 11 are normally maintained at the reference potential or ground, and the conductors in sequence are periodically impressed with a higher potential.

Individual conductors 12 in the second set of conductors are connected to the input terminals of an analogue multiplexer 20. One such suitable commercially available multiplexer is a 4051 8-channel multiplexer manufactured by RCA or Motorola. In addition to the plurality of input terminals to which conductors 12 are connected, multiplexer 20 has an output terminal 21 and address terminal means 22. Multiplexer 20 operates to transfer the signal from a selected one of its input terminal to its output terminal. The selected input terminal is determined by an address signal supplied to address terminal means 22. This address signal is also generated by microprocessor 19 which typically generates a sequence of address signals such that multiplexer 20 transfers the signals on each of conductors 12 in sequence to output terminal 21.

A second demultiplexer 24 and plurality of inverters 25, similar to demultiplexer 14 and inverters 18 are connected to conductors 12. Demultiplexer 24 is shown having address terminal means 26 and a plurality of output terminals 27. As with conductors 11, conductors 12 are normally maintained at a reference potential or electrical ground, and are selectively permitted to assume a potential different from the reference potential. However, no bias potential is supplied to the outputs of inverters 25 or conductors 12. Therefore, the signal on any of conductors 12 during the time that it is addressed by demultiplexer 24 is determined by the magnitude of the capacitive coupling between it and conductors 11. Since only one of drive conductors 11 is impressed with a potential different from the reference potential at any one time, the signal on the addressed one of conductors 12 depends on the state of actuation of the capacitor connecting it and the addressed drive conductor.

Demultiplexer 24 receives its address signals from microprocessor 19. As shown for illustrative purposes in the FIGURE, both multiplexer 20 and demultiplexer 24 are connected to the same address terminals of microprocessor 19, and therefore receive the same address signal. Accordingly, the signal transferred by multiplexer 20 at any time is the signal from the one of conductors 12 which is permitted to assume a potential different from the reference potential.

Under the control of microprocessor 19, the drive and sense conductors are scanned sufficiently rapidly to address every capacitor 13 in the array of capacitors during an interval shorter than any intentional key actuation of a capacitor. Only the pair of conductors connected to a single capacitor are addressed at any one time. All other conductors are maintained at the reference potential. Accordingly, none of the drive conductors except for the addressed conductor can contribute to the signal on the sense conductors. Similarly, the signal on the addressed sense conductor cannot be affected by potentials on any other sense conductor, nor can it transfer a signal through coupling with any other sense conductor.

In normal operation the only parameter which can affect a signal on the addressed sense conductor is the state of actuation of the capacitor coupling the addressed sense and drive conductors. Accordingly, stray capacitive coupling and cross talk are effectively eliminated. In addition, spurious signals due to electrical interference from other sources are virtually eliminated from conductors in the matrix. Finally, ambiguities in the detected signal which may result from simultaneous actuation of more than one capacitor key switch, known as rollover, is effectively precluded. Since only one capacitor in the capacitor array is addressed at any one time, N-key rollover operation is inherently provided.

In accordance with the applicant's invention, no elements in addition to the basic capacitive keyboard elements are required in or on the keyboard. Without the necessity of ground planes, intramatrix ground lines, or other elements not basic to the keyboard, the keyboard matrix can be simply and inexpensively fabricated using elementary circuit board fabrication techniques. The need for bridging elements, of which an example is disclosed in U.S. Pat. No. 4,234,871 issued to N. Guglielmi, et al on Nov. 18, 1980, multilayer circuit boards, extensive feedthroughs or other extraordinary provisions is avoided. Furthermore, electronic grounding of the inactive matrix conductors is simply accomplished with only a minimal addition to the scanning circuitry common to conventional capacitive keyboards.

The signal on output terminal 21 of multiplexer 20 is supplied to a relatively conventional detector circuit 30 which includes an amplifier 31 with a feedback circuit 32, a threshhold limiter 33, a pulse stretcher 34 and an output stage 35. The combination of multiplexer 20 and detector circuit 30 may be considered a scanning detector.

The output signal of detector circuit 30 is furnished to any suitable utilization apparatus, which may be any of a variety of information handling or data processing equipments. The operation of the utilization device may be synchronized with scanning of the keyboard either through a connection (not shown) with microprocessor 19, or by means of supplying the address signals to the keyboard as necessary to identify the addressed point in the keyboard matrix.

In accordance with the foregoing description, the applicant has provided a capacitive keyboard with a unique scanning and screening arrangement which provides exceptional immunity to cross talk and electrical interference. These functional capabilities are provided by apparatus which is exceptionally simple and inexpensive relative to other conventional capacitive keyboard designs. Although a specific embodiment is shown and described for illustrative purposes, a number of variations and modifications will be apparent to those familiar with the relevant arts. It is intended that coverage of the invention not be limited to the embodiment shown, but only by the terms of the following claims.

The embodiments of the invention in which an exclusive property or right is claimed are defined as follows:

1. Capacitive keyboard apparatus comprising:
   a matrix of capacitive key switches having first and second sets of conductors and a plurality of capacitors, each capacitor having fixed and movable plates, the fixed plates being connected to the first set of conductors and the movable plates being connected to the second set of conductors so that each capacitor is connected to a unique pair of conductors comprising one conductor from each of the first and second sets of conductors;
   scanning drive means for sequentially supplying a drive signal to individual conductors of one of the first and second sets of conductors while maintaining all other conductors of the set at a reference potential;
   a first digital demultiplexer having a plurality of output terminals which are normally at a logical high state and are selectively caused to go to a logical low state in response to an address signal supplied to address signal means thereon;
   a plurality of inverters, each connecting an output terminal of said first digital demultiplexer to a separate conductor of the other of the first and second sets of conductors, whereby individual conductors of said other set are normally at the reference potential, and are selectively permitted to go to a different potential to permit sensing of capacitive coupling with conductors of said one of the first and second sets;
   an analogue multiplexer having a plurality of input terminals each connected to a separate conductor in the set of conductors on which capacitive coupling is sensed, said analogue multiplexer being operable to transfer the signal from a selected conductor to an output terminal in response to an address signal supplied to address signal means; and
   an address generator for supplying coordinated address signals to said first digital demultiplexer and said analogue multiplexer so that the conductor permitted to assume a potential different from the reference potential is the conductor whose signal is transferred by said analogue multiplexer, thereby precluding any transfer of signals between conductors other than the conductor receiving the drive signal and the conductor on which capacitive coupling is sensed.

2. The capacitive keyboard apparatus of claim 1 wherein said scanning drive means comprises:
   bias means tending to maintain individual conductors of the set of conductors to which drive signals are supplied at a potential higher than the reference potential;
   a second digital demultiplexer having a plurality of output terminals which are normally at a logical high state and may be selectively caused to go to a logical low state by address signals supplied to address terminal means thereon; and which
   a plurality of inverters, each connecting an output terminal of said second digital demultiplexer to a separate conductor of the set of conductors to which drive signals are supplied, whereby the conductors are normally maintained at the reference potential, and are sequentially caused to go to the potential determined by said bias means.

3. In combination:
   an array of key actuable variable capacitors, each having first and second plates;
   a first plurality of electrical conductors, each connected to the first plates of a separate row of said capacitors;
   a second plurality of electrical conductors, each connected to the second plates of a separate column of said capacitors;
   sensing means for sequentially addressing individual conductors in one of said first and second pluralities of electrical conductors to receive signals therefrom;
   a first digital demultiplexer having a plurality of output terminals which are normally at a logical high state and which can be selectively caused to go to a logical low state in response to an address signal supplied to address terminal means thereon;

means for supplying address signals to said first digital demultiplexer to cause the output terminals thereof to sequentially go to a logical low state;

a first plurality of inverters, each connecting one output terminal of said first digital demultiplexer to one of the conductors in the other of said first and second pluralities of electrical conductors; and bias means tending to maintain the conductors in the plurality of electrical conductors addressed by said first digital demultiplexer at a potential higher than a reference potential, whereby the conductors are normally maintained at the reference potential and whereby the higher potential is selectively impressed on individual conductors.

4. The combination of claim 3 wherein said sensing means comprises:

an analogue multiplexer having a plurality of input terminals, each input terminal being connected to a separate conductor in the plurality of electrical conductors addressed by said sensing means, said analogue multiplexer being operable to transfer the signal from a selected conductor to a detector output terminal in response to an address supplied to address terminal means;

a second digital demultiplexer having a plurality of output terminals which are normally at a logical high state and can be selectively caused to go to a logical low state in response to a signal supplied to address terminal means thereon;

a second plurality of inverters, each connecting an output terminal of said second digital demultiplexer to one of the conductors in the plurality of electrical conductors addressed by said sensing means, whereby the conductors are normally maintained at the reference potential and whereby individual conductors are selectively permitted to assume a potential other than the reference potential; and means connecting the address terminal means of said analogue multiplexer and said second digital demultiplexer so that they substantially simultaneously address the same conductor.

5. The combination of claim 4 wherein said reference potential is electrical ground.

6. In a capacitive keyboard apparatus of the type in which first and second sets of conductors are coupled by an array of key actuated variable capacitors such that each capacitors couples a different pair of conductors comprising one conductor from each set, and the sets of conductors are scanned to detect actuated capacitors, improved screening apparatus which comprises:

a first digital demultiplexer having a plurality of output terminals which are normally at a logical high state and which can be selectively caused to go to a logical low state in response to an address signal supplied to address terminal means thereon;

a plurality of inverters, each connecting one output terminal of said digital demultiplexer to a separate conductor in the first set of conductors, whereby the conductors in the first set of conductors are normally maintained at a reference potential and are sequentially permitted to assume a potential different from the reference potential;

a scanning detector for sequentially sensing the potentials on individual conductors in the first set of conductors; and control means for providing coordinated operation of said first digital demultiplexer and said scanning detector so that said scanning detector senses the potential on each conductor in the first set of conductors only during the time interval in which the conductor is permitted to assume a potential different from the reference potential.

7. The capacitive keyboard apparatus of claim 6 further comprising:

a second digital demultiplexer having a plurality of output terminals which are normally at a logical high state and which can be selectively caused to go to a logical low state in response to an address signal supplied to address terminal means thereon;

a plurality of inverters, each connecting one output terminal of said digital demultiplexer to a separate conductor in the second set of conductors; and bias means tending to maintain the conductors in the second set of conductors at a potential different from the reference potential, whereby the conductors in the second set of conductors are normally maintained at the reference potential and are sequentially impressed with a potential different from the reference potential.

8. Capacitive keyboard apparatus comprising:

a first plurality of electrical conductors;

a second plurality of electrical conductors;

an array of key actuable variable capacitors;

means for interconnecting said capacitors and said first and second pluralities of conductors such that each capacitor is connected between a different pair of conductors comprising one conductor from said first plurality of conductors and one conductor from said second plurality of conductors, whereby variable capacitive coupling is provided between conductors in a pair, the magnitude of the capacitive coupling being dependent on the state of actuation of the associated capacitor;

a first digital demultiplexer having address terminal means and a plurality of output terminals, said first demultiplexer providing a logical high state at its output terminals except for any output terminal during the time it is addressed by an address signal supplied to the address terminal means;

a first plurality of inverters, each connecting an output terminal of said first digital demultiplexer to a separate conductor of said first plurality of conductors, whereby the conductors of said first plurality of conductors, except for the conductor associated with the addressed output terminal, are maintained at a reference potential;

an analogue multiplexer having a plurality of input terminals each connected to a separate conductor of said first plurality of conductors, an output terminal and address terminal means, said multiplexer being operable to transfer the signal from any selected input terminal to its output terminal in response to an address signal supplied to the address terminal means;

a scanning address generator for supplying address signals which cause said analogue multiplexer to transfer signals only from the conductor associated with the addressed output terminal of said first digital demultiplexer; and scanning drive means for supplying a drive potential to individual conductors of said second plurality of conductors in sequence and maintaining all conductors of said second plurality conductors except the conductor to which the drive potential is supplied at a reference potential.

9. The capacitive keyboard apparatus of claim 7 wherein said scanning drive means comprises:

a second digital demultiplexer having address terminal means and a plurality of output terminals, said second demultiplexer providing a logical high state at its output terminals except for any output terminal during the time it is addressed by an address signal supplied to the address terminal means; and a second plurality of inverters, each connecting an output terminal of said second digital demultiplexer to a separate conductor of said second plurality of conductors, whereby the conductors of said second plurality of conductors, except for the conductor associated with the addressed output terminal, are maintained at the reference potential.

* * * * *

UNITED STATES PATENT OFFICE
CERTIFICATE OF CORRECTION

PATENT NO. : 4,405,917

DATED : SEPTEMBER 20, 1983

INVENTOR(S) : THOMAS Y. CHAI

It is certified that error appears in the above-identified patent and that said Letters Patent are hereby corrected as shown below:

Column 6, line 43, after "and" add --which--;

line 45, delete "which".

Column 7, line 50, change "capacitors" to

--capacitor--.

Signed and Sealed this

Twenty-ninth Day of November 1983

[SEAL]

Attest:

GERALD J. MOSSINGHOFF

Attesting Officer   Commissioner of Patents and Trademarks